(No Model.)
J. A. MYERS.
MILK COOLING APPARATUS.
No. 508,146. Patented Nov. 7, 1893.
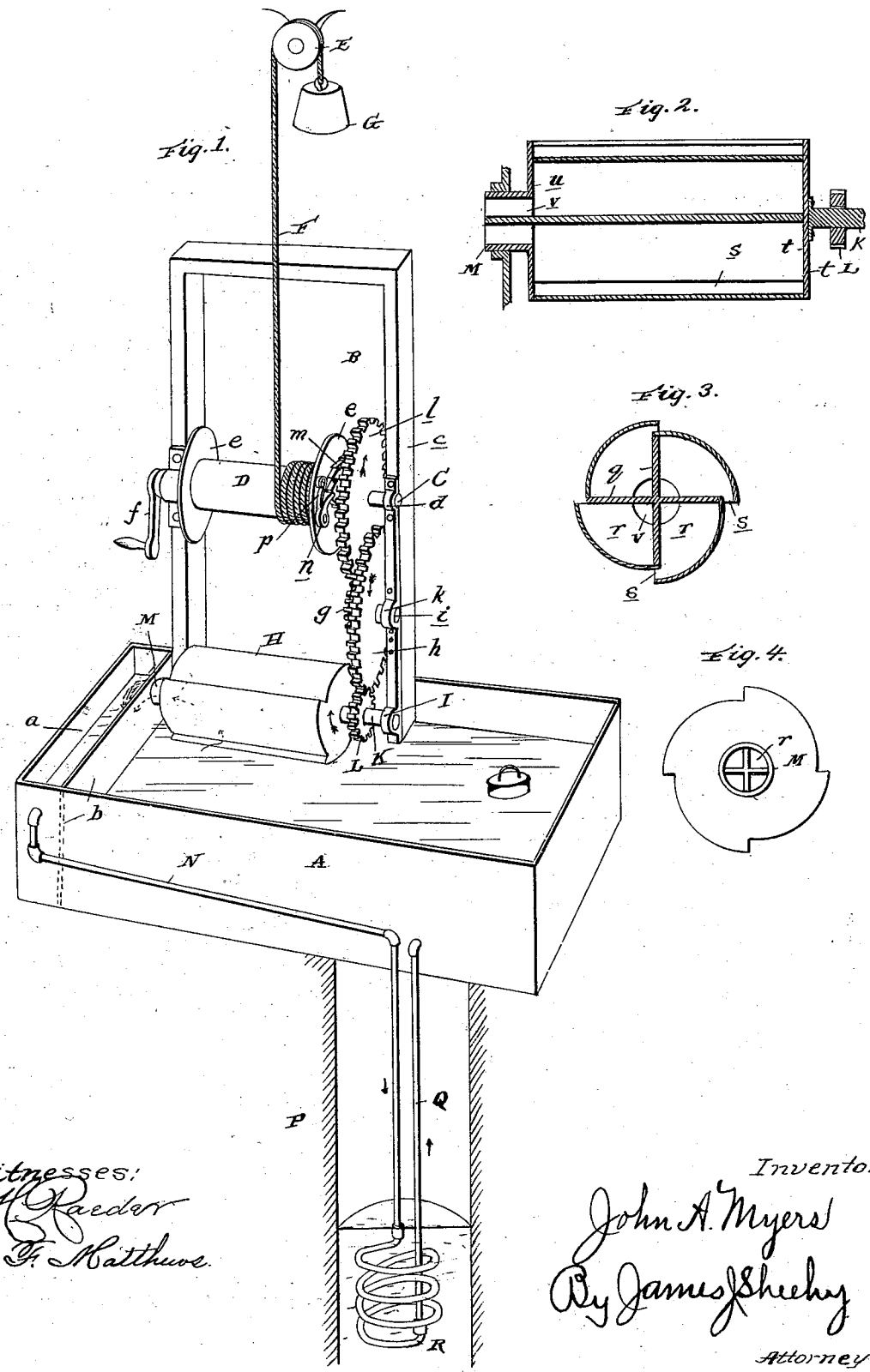
Witnesses:
A. Raeder
N. F. Matthews
Inventor
John A. Myers
By James Sheehy
Attorney

UNITED STATES PATENT OFFICE.

JOHN ADDISON MYERS, OF MILLERSBURG, IOWA.

MILK-COOLING APPARATUS.

SPECIFICATION forming part of Letters Patent No. 508,146, dated November 7, 1893.

Application filed September 12, 1891. Serial No. 405,557. (No model.)

*To all whom it may concern:*

Be it known that I, JOHN ADDISON MYERS, a citizen of the United States, residing at Millersburg, in the county of Iowa and State of Iowa, have invented certain new and useful Improvements in Milk-Cooling Apparatus; and I do declare the following to be a full, clear, and exact description of the invention, such as will enable others skilled in the art to which it appertains to make and use the same.

This invention relates to an apparatus designed to be used in connection with a well or other cold water source for cooling milk or other liquids or substances desired to be kept in a cool state, and among other things it has for its object to afford a gradual but constant supply of cold water to a tank within which cans of milk or other liquids may be placed for cooling purposes.

A further object of the invention is to lessen the labor and time heretofore required in keeping milk cool, and to also reduce to a comparatively small quantity the amount of water used for such cooling purposes.

Other objects and advantages will appear from the following description and claims when taken in connection with the accompanying drawings, in which—

Figure 1, is a perspective view of my improved apparatus showing the same in connection with a well, as the cooling medium. Fig. 2, is a longitudinal sectional view of the drum for conveying the water from the main tank or reservoir into the small compartment therein. Fig. 3, is a cross sectional view of said drum, and Fig. 4, is an end view of same.

Referring by letter to said drawings:—A, indicates a tank or reservoir, which may be of rectangular or other suitable shape, and of a capacity to hold a desired quantity of water, in which cans of milk or liquids to be kept cool are placed. This tank has a chamber or compartment $a$, at one end which is separated from the main tank by means of a tight vertical partition $b$, so that the water in one chamber or compartment will be prevented from entering the other without mechanical force. This tank is designed to be arranged at a convenient distance from the well so that it may be connected therewith as will be presently described.

B, indicates an upright frame rising from one side of the tank A, and provided at a suitable altitude in its standards $c$, with bearings $d$.

C, indicates a horizontal shaft which is journaled in the bearings $d$, and D, indicates a windlass which is fixed upon said shafts having flanges $e$, at opposite ends, and carries at one end outside of the flange thereof, a fixed hand crank $f$, for turning said windlass. Arranged loosely on the opposite end of the shaft C, is a vertically disposed toothed gear $l$, which is designed to mesh with a vertically disposed toothed pinion $g$, which is secured to a short horizontal shaft $i$, journaled in a bearing eye $k$, secured to one of the uprights of the frame B. On the inner side of the gear $l$, is a ratchet wheel $m$, designed to engage with a pawl $n$, pivoted on the outer side of one of the flanges $e$, of the windlass and backed by a spring $p$.

E, indicates a pulley which is arranged at a suitable altitude on any desired support, and over this guide pulley E, passes a rope F, one end of which is secured to the drum D, and the opposite end carries a weight G.

H, indicates a drum. This drum which is designed to elevate the water in the tank A, and convey it into the compartment $a$, is of a peculiar construction, having its periphery provided with elevating buckets. This drum is journaled in the tank A, being supported at one end by the bearing eye I, receiving one end of the trunnion K, secured to the head of the drum, and which has fixed to it a vertically disposed pinion L, meshing with the gear $h$, and the opposite end or tube M, has a bearing in a bracket or casting secured to the inner wall of the trough. This elevating drum is divided longitudinally by walls $q$, into buckets $r$, which have a receiving mouth $s$, lengthwise of the drum so as to receive water from the tank A, as said drum is revolved in one direction. One head $t$, of this drum is closed, while the other head $u$, is provided with a central annular aperture $v$, and surrounding this aperture on the outer side of the head and communicating with each bucket or compartment $r$, is a tube M, of less diameter than the drum. This tube M, extends through a corresponding aperture in the partition wall $b$, of the tank so that the water raised by each bucket of the drum will be conveyed through this small tube M, into the chamber *a*, and it is designed that the water in this chamber *a*, should be kept at a higher level than the water in the main tank.

N, indicates a pipe having suitable connections and leading from the interior of the chamber *a*, to the well P, and Q, indicates a pipe which leads from the interior of the main tank or reservoir also to the interior of the well.

R, indicates a worm or coil which is submerged in the water of the well and is connected at one end with the lower end of the pipe N, and its opposite end with the lower end of the pipe Q, so that the water passing from the chamber *a*, through the pipes N will pass through the coil or worm, and thence through the medium of the pipe Q, into the main tank or reservoir, as long as the water in the chamber *a*, remains at a greater height than that in the main tank or reservoir.

Although I have shown and described my apparatus in connection with a well, yet it is obvious that it might work in connection with a stream of cold water, or the coil may be so constructed as to be placed in a bed of ice or inclosed in any other cooling medium, it being simply necessary that a cold body should inclose the coil.

In operation water is first placed in the main tank A, when the hand crank should be turned so as to wind the rope upon the drum D, when through the medium of the gearing and the weight G, falling gradually, rotary motion will be imparted to the elevating drum, and the water from the main tank or reservoir conducted steadily into the chamber *a*, and as such water as may rise above the level of the water in the main tank or reservoir is carried off by means of the pipe N, it passes through the coil or worm R, in the well, and from thence is forced back into the main tank so that by keeping the water passing slowly and continuously from the main tank, through the coil in the well, and back again, such water will be reduced to a temperature to keep the milk properly cool.

It will be observed that I have shown the bearings for one end of the windlass shaft, gear, and drum, made in one piece and I prefer such construction, yet if desired, such bearings might be made separately.

Having described my invention, what I claim is—

1. A milk cooling apparatus comprising in connection with a well or other cooling source, a tank or reservoir having an auxiliary chamber separated from the main chamber, a rotatable drum formed with the elevating buckets and journaled in the main tank; said drum having the central tube communicating with the respective buckets thereof and adapted to receive the water dipped up from the main tank and conduct it into the auxiliary chamber, pipes leading from the respective chambers, a coil or worm of pipe connecting the said pipes and adapted to be submerged in the well or other cooling source, and a suitable means for rotating the drum, substantially as specified.

2. In a milk cooling apparatus, substantially as described, the combination with a tank or reservoir comprising the main chamber, and the chamber or compartment *a*, pipes leading from the main chamber and the chamber or compartment *a*, and a worm or coil adapted to be immersed in a cooling agent and connecting the said pipes, of the elevating drum H, comprising the trunnion journaled in suitable bearings, the radially disposed walls *q*, the curvilinear walls serving in conjunction with the walls *q*, to form the buckets *r*, and the receiving mouths *s*, the tube M, connected to one end of the drum and journaled in the wall between the main chamber of the tank and the chamber *a*, the said tube M, being adapted to receive water from the buckets *r*, and lead the water elevated by said buckets into the chamber or compartment *a*, and a suitable means for rotating the elevating drum, substantially as and for the purpose set forth.

In testimony whereof I affix my signature in presence of two witnesses.

JOHN ADDISON MYERS.

Witnesses:
  J. L. MILLER,
  J. S. WATTS.